Aug. 19, 1941.  C. T. CUTTING  2,253,458
MULTIPLE STICK HOLDING DEVICE
Filed July 22, 1940  2 Sheets-Sheet 1
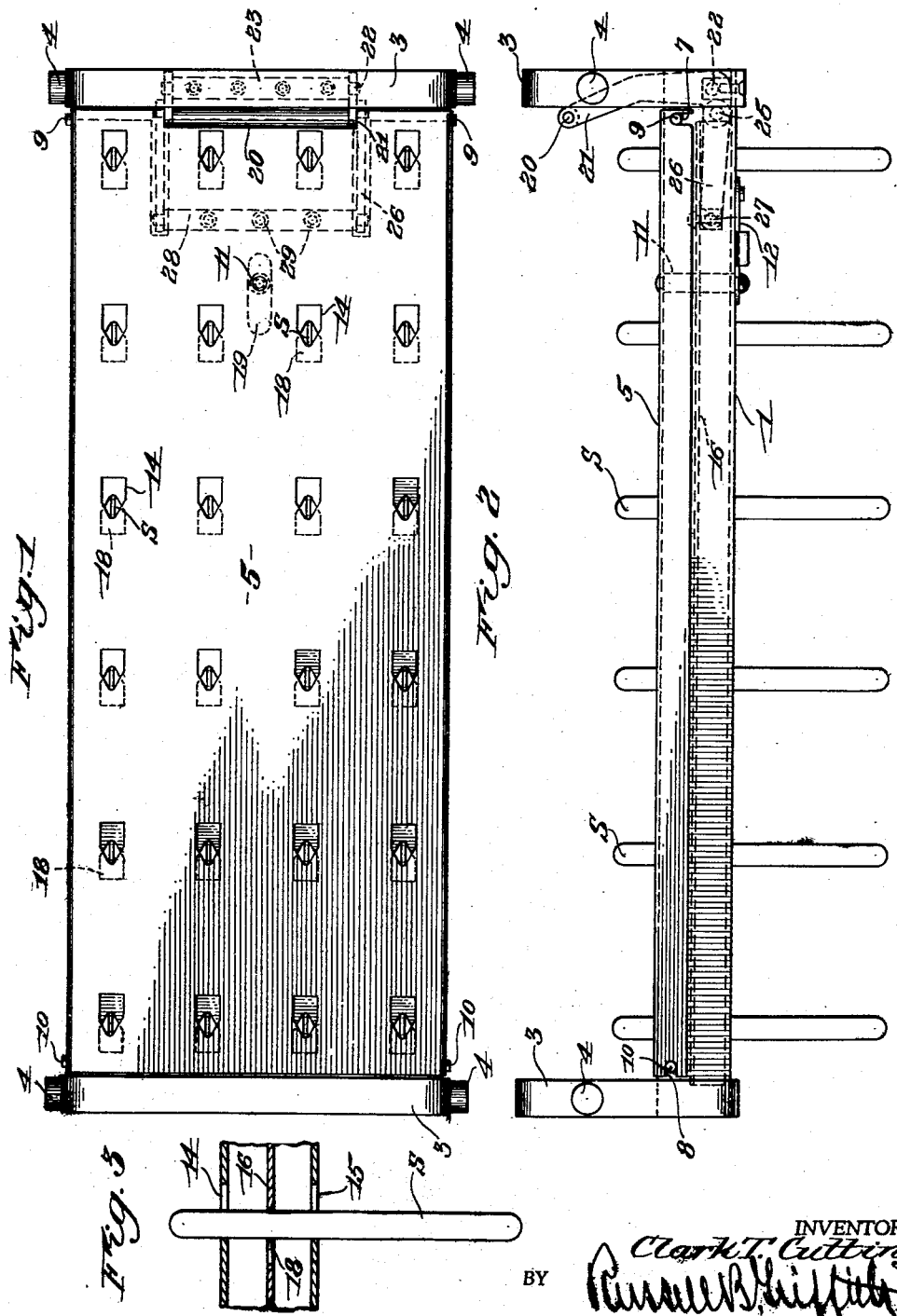
INVENTOR.
Clark T. Cutting
BY
his ATTORNEY.

Aug. 19, 1941.　　C. T. CUTTING　　2,253,458
MULTIPLE STICK HOLDING DEVICE
Filed July 22, 1940　　2 Sheets-Sheet 2
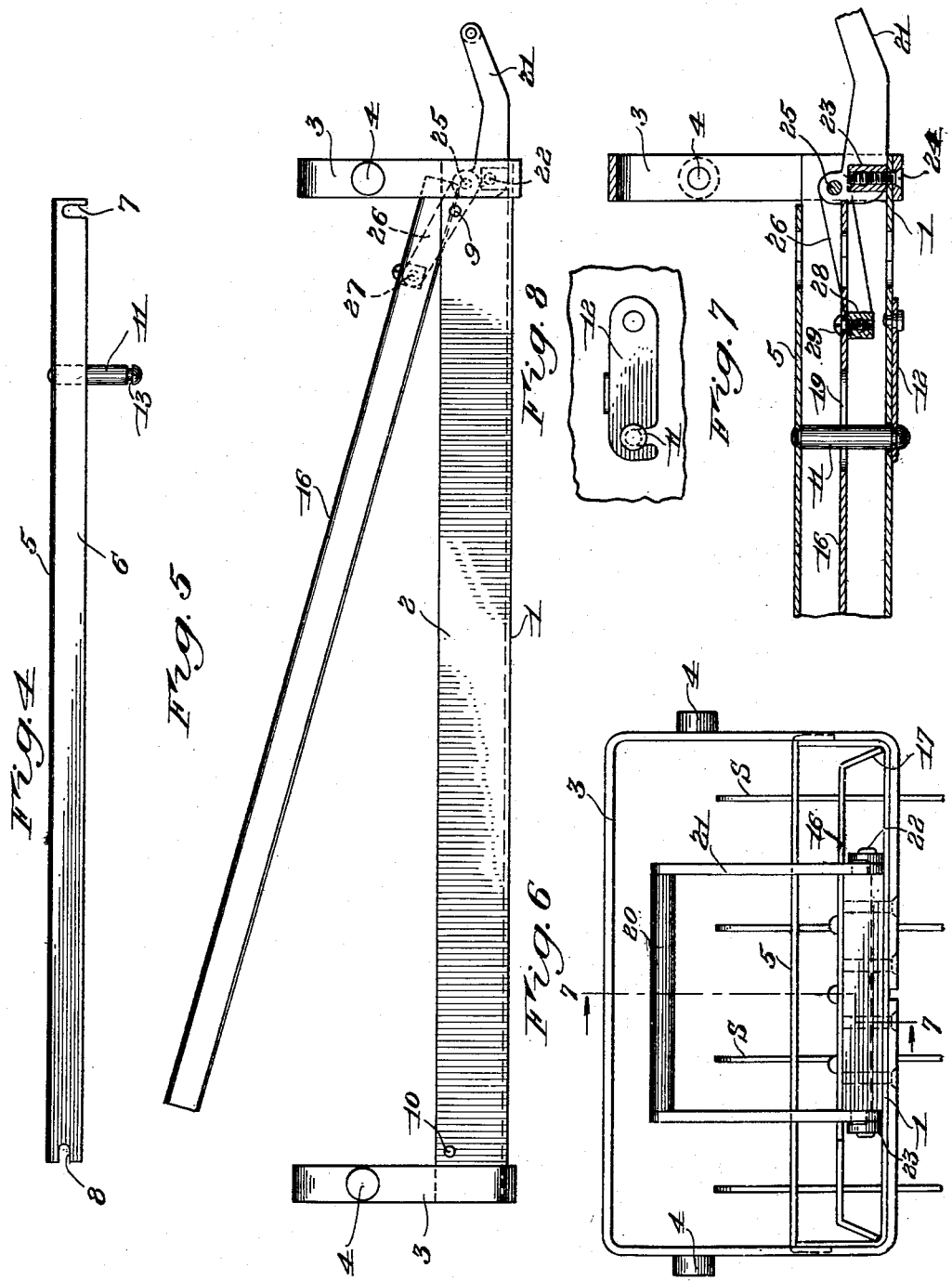
INVENTOR.
Clark T. Cutting
BY Russell B. Griffith
his ATTORNEY.

Patented Aug. 19, 1941

2,253,458

UNITED STATES PATENT OFFICE 2,253,458

MULTIPLE STICK HOLDING DEVICE

Clark T. Cutting, Canandaigua, N. Y.

Application July 22, 1940, Serial No. 346,733

9 Claims. (Cl. 294—87)

My present invention relates to the art of forming confections and similar bodies through the process of dipping a carrier holder or stick into a fluid mass and accumulating the substance thereon, either as a main body or as a coating therefor. An instance is the preparation of ice cream frozen to a stick which latter serves both as a supporting element and as a handle for the use of the consumer.

The invention is not directly concerned with any particular article or any particular method of forming it beyond the fact that it contemplates the provision of means in the nature of a dipping tray for holding in precise positions a plurality of the sticks referred to so that they may be dipped or otherwise manipulated in unison and with uniformity. The invention has for its general object to provide a simple and conveniently manipulatable tray of this character that can be economically produced and will hold the sticks accurately and securely while necessary and yet release them promptly when the tray is to be reloaded and refilled. A further object of the invention is to so construct the device that all of its parts can be relatively displaced to separate them in such manner that their surfaces will be accessible for cleaning purposes, sanitation being important particularly with milk products such as ice cream.

To these and other ends, the invention resides in certain improvements and combination of parts, all as will be hereinafter more fully described, the novel features being pointed out in the claims at the end of this specification.

In the drawings:

Figure 1 is a top plan view of a multiple stick holding device and dipping tray constructed in accordance with and illustrating one embodiment of my invention;

Figure 2 is a side view thereof with a plurality of sticks in place therein;

Figure 3 is a fragmentary vertical sectional view, enlarged, showing one stick in secured position;

Figure 4 is a side view of the upper holding element, detached;

Figure 5 is a similar view, in assembling relationship with the latter on the sheet, of the remaining elements partially displaced from their operative positions;

Figure 6 is a slightly enlarged end view showing the actuating mechanism for the clamping element;

Figure 7 is a fragmentary vertical sectional view through the latter on the line 7—7 of Figure 6, and Figure 8 is a plan view of a latch on the bottom of the device.

Similar reference numerals throughout the several views indicate the same parts.

In general, the device of the present embodiment comprises upper and lower parallel clamping plates, the former of which is detachable from but rigidly connected to the other in operative assembly. These plates have a multiplicity of alined perforations constituting sockets. Slidable between them is a clamping plate with perforations generally alined with those first mentioned. Through an operating handle and suitable actuating mechanism the clamping plate is given a slight movement back and forth to engage or release sticks inserted in the sockets and through the two plates.

Referring more particularly to the drawings, I indicates the bottom clamping plate having vertical flanges 2 along its sides. At its end it is provided with bails 3 forming strap handles for manipulation of the device, which handles are fitted with trunnions 4 serving as rests while the holder is being loaded.

The upper holding plate is indicated at 5 and also has vertical and depending side flanges 6. At one end these flanges are notched horizontally at 8 and at the other end they are notched vertically at 7. Laterally projecting pins 9 and 10 are provided near the ends of the flanges 2 of the lower plate. The two plates are assembled by first inserting notch 8 over pin 10 and then rotating the upper plate so that notch 7 latches over pin 9, as shown in Figure 2. Or plate 5 may be swung inwardly from plate 1 on pin 10 as a pivot for access to the interior or final disengagement.

When assembled, the two plates are held firmly together in parallel relationship with flange 6 overlapping flange 2 by means of a locking post 11. This is riveted to plate 5 and extends through an opening in plate 1. On the other side of the latter is a simple pivoted latch 12, shown in detail in Figure 8, that engages a protruding shoulder 13 on the post.

The two plates, as aforesaid, have rows of alined perforations 14 and 15 which, in the adaptation to the holding of the usual flat confection stick S, are tapered at one end. The general idea is to support the tray or holder on the trunnions 4 a suitable fixed distance above a stop surface, according to the length of the sticks S, and then drop the latter through the alined socket perforations 14 and 15 so that they are uniformly placed as appears in Figure 2. Thereafter, the intermediate clamping element about to be described is put into play to so clamp the sticks in their apertures whereupon the tray may be raised and transferred to the dipping tank or mold, as the case may be, with all of the sticks firmly held in exactly the same manner and protruding the same distance at the bottom.

This clamping element consists, in the present instance, of another and intermediate plate 16 that has a slight longitudinal reciprocatory movement in a plane about half way between holding plates 1 and 5. Depending flanges 17 guide it on bottom plate 1 which flanges engage in the corners formed by the side flanges 2 of the latter. There are perforations 18 in plate 16, one of which is alined with each pair of perforations 14 and 15 in the holding plates with the exception that while this perforation is preferably of the same shape, it is directionally reversed from the other two so that its tapered end is in opposition to the others. Therefore, as indicated in Figures 1 and 3, when the sticks have been inserted and clamping plate 16 is moved very slightly to the left the tapered end of the perforation 18 will very gently, but nevertheless firmly, engage and bite into the edge of the stick at a point between the holding plates while the other edge of the stick reacts against the tapered ends of the perforations 14 and 15. The engagement is not so severe that the sticks will not instantly release themselves and drop through when clamping plate 16 is moved back to the right and it is desired to dump the holder and refill.

Of course, plate 16 is provided with an elongated opening 19 as shown in Figure 7 to accommodate the rigid locking post 11 previously described.

The means for operating and releasing the intermediate clamping plate embodies another bail-like operating handle 20 having two parallel-like arms 21. When the sticks are locked in place, as in Figures 1, 2 and 6, these arms are substantially upright with the handle 20 generally below one of the tray supporting bails or handles 3 and convenient to the hand and fingers of the operator. When the sticks are released, as in Figures 5 and 7, or the device is being filled with sticks, the handle 20 and the arms 21 swing outwardly through handle 3 and downwardly at the end of the tray to a substantially horizontal position, as shown.

The actuating mechanism for the clamping plate 16 that these movements and positions of the operating handle affect is best shown in Figures 2, 6 and 7. The arms 21 are in the nature of bell-crank levers. They turn on pivots 22 in a bearing block 23 secured to the top of bottom plate 1 as by the screws 24 that also hold the strap handle 3 in the present instance. A bar 25 connecting the arms on a relatively offset center forms a pivot upon which turn a pair of links 26 that plate 16 is slotted to accommodate. The opposite ends of the links are pivoted at 27 to posts 28 secured to the under side of plate 16 by screws 29. The result is a simple link motion that draws the intermediate clamping plate 16 backward and forward to the degree desired in effecting the clamping or the release of the transverse sticks S because, as aforesaid, when the arms 21 are down such plate 16 is pulled to the right and when they are raised the plate is correspondingly pushed to the left.

It will be evident that the amplitude of movement of the clamping plate 16 is very slight so far as it is necessary to admit, clamp and release the sticks S. Therefore, the distance between the centers 22 and 25 is not great. Furthermore, when the clamping position is attained the revolving center 25 on the bell-crank can pass the dead center between pivot 22 and pivot 27 very slightly, as shown in Figure 2, and tend to lock all of the related parts in their operative positions. In other words, when pivot 25 passes such dead center it is stopped by plate 1 at a point at which it has not tended to release the clamping plate 16 appreciably from the sticks and yet it holds operating element 21 so that the latter will maintain its own position.

As previously described, upper clamping plate 5 is separate from and may be lifted off of its companion plate 1, as in Figures 4 and 5, and readily cleaned on both sides. Similarly, intermediate clamping plate 16 may be raised, as shown in Figure 5, on the link connection with the operating handle and made accessible for cleaning on both its upper and under sides, while the inner surface of lower plate 1 is itself exposed for the same purpose by the same operation. This relative displacement of the parts is quickly and easily effected by releasing the latch 12, and the device is firmly reassembled in a reverse manner by swinging plate 16 back in place and bringing plate 5 down in the nature of a cover.

It will be noted that the actuating mechanism for the clamping plate is entirely housed between the holding plates so that it does not interfere with any of the aforesaid manipulations besides presenting a neat and attractive appearance on the part of the tray as a whole. Yet this mechanism can be reached for cleaning as readily as the other parts.

I claim as my invention:

1. In a multiple stick holding device of the character described, the combination with upper and lower relatively displaceable supports having alined stick sockets therein, of an intermediate relatively longitudinally movable stick clamping element guided therebetween, and actuating means for the clamping element entirely housed between the supports when assembled together.

2. In a multiple stick holding device of the character described, the combination with upper and lower relatively displaceable supports having alined stick sockets therein, of an intermediate relatively longitudinally movable stick clamping element guided therebetween, an actuating means for the clamping element entirely housed between the supports when assembled together, and an operating element connected to the actuating means and extending from between the ends of the supports in the general plane of the clamping element for manual accessibility.

3. In a multiple stick holding device of the character described, the combination with a pair of upper and lower parallel supporting plates having alined stick sockets therein, said plates being separable but normally latched together, of an intermediate relatively longitudinally movable stick clamping plate guided therebetween, and actuating means for the clamping plate pivotally connecting it with one of the supporting plates but permitting it to be swung outwardly free therefrom when the other supporting plate is displaced.

4. In a multiple stick holding device of the character described, the combination with a pair of upper and lower parallel supporting plates having alined stick sockets therein, said plates being separable but normally latched together, of an intermediate relatively longitudinally movable stick clamping plate guided therebetween, and actuating means for the clamping plate pivotally connecting it with one of the supporting plates and permitting it to be swung outwardly free therefrom when the other supporting plate is displaced, said actuating means embodying a pivot on the under side of the clamping plate, a link on the pivot located between the supporting plates, and a bell-crank lever pivoted to said last mentioned supporting plate, said lever being extended to be accessible manually from the exterior of both supporting plates.

5. In a multiple stick holding device of the character described, the combination with a lower supporting plate and an upper supporting plate spaced therefrom but pivotally and separably connected thereto for accessibility in the cleaning of both, of an intermediate relatively longitudinally movable stick clamping element guided therebetween, and actuating means for the latter pivotally connected thereto to permit it to be swung outwardly for cleaning purposes after the two said supporting plates have been so separated.

6. In a multiple stick holding device of the character described, the combination with a lower supporting plate and an upper supporting plate spaced therefrom but pivotally and separably connected thereto for accessibility in the cleaning of both, of an intermediate relatively longitudinally movable stick clamping element guided therebetween, actuating means for the latter pivotally connected thereto to permit it to be swung outwardly for cleaning purposes after the two said supporting plates have been so separated, and means for releasably securing the said lower and upper supporting plates together to definitely confine the intermediate clamping plate.

7. In a multiple stick holding device of the character described, the combination with a lower supporting plate and an upper supporting plate spaced therefrom but pivotally and separably connected thereto for accessibility in the cleaning of both, of an intermediate relatively longitudinally movable stick clamping element guided herebetween, and actuating means for the latter pivotally connected thereto to permit it to be swung outwardly for cleaning purposes after the two said supporting plates have been so separated, said actuating means embodying a link arranged between the supporting plates and pivoted to the clamping element, an operating lever pivoted to one of the supporting plates on a center arranged between the two, and a pivotal connection between the link and the operating lever on which the operating lever throws across a center and sustains the locking element in its operative position.

8. In a multiple stick holding device of the character described, the combination with a lower supporting plate and an upper supporting plate spaced therebetween but pivotally and separably connected thereto for accessibility in the cleaning of both, of an intermediate relatively longitudinally movable stick clamping element guided therebetween, actuating means for the latter pivotally connected thereto to permit it to be swung outwardly for cleaning purposes after the two said supporting plates have been so separated, and means for releasably securing the said lower and upper supporting plates together to definitely confine the intermediate clamping plate, said means comprising a post secured to the upper holding plate and projecting through the other two plates and a latch on the under side of the lower clamping plate interlocking with the post.

9. In a multiple stick holding device of the character described, the combination with upper and lower relatively displaceable supports having alined stick sockets therein and a bail handle secured to the lower holding plate at one end, of an intermediate relatively longitudinally movable stick clamping element guided therebetween, actuating means for the clamping element entirely housed between the supports, and an operating element connected to the actuating means and extending from between the ends of the supports in the general plane of the clamping element for manual accessibility, said operating element being adapted to swing within the plane of the bail handle.

CLARK T. CUTTING.